United States Patent
Cousins

[15] 3,690,775
[45] Sept. 12, 1972

[54] BORESCOPE FIXTURE
[72] Inventor: Nicholas T. Cousins, Bridgeport, Conn.
[73] Assignee: Avco Corporation, Stratford, Conn.
[22] Filed: Sept. 1, 1971
[21] Appl. No.: 176,897

[52] U.S. Cl. ............................................. 356/241
[51] Int. Cl. ............................................ G01n 21/16
[58] Field of Search .... 356/241; 73/151, 116; 350/11

[56] References Cited
UNITED STATES PATENTS
3,434,775   3/1969   Gosselin .................. 356/241 X
3,519,363   7/1970   Ritcher et al. ............. 356/241

Primary Examiner—Ronald L. Wibert
Assistant Examiner—F. L. Evans
Attorney—Charles M. Hogan et al.

[57] ABSTRACT

A fixture to permit use of a flexible borescope to inspect inaccessible recesses of engines is disclosed. The borescope fixture is adapted to be fitted into an existing threaded hole of the engine. A semi-rigid tube is shaped to reach from the hole in the engine casing to the engine location of interest so as to permit the flexible borescope to reach such location for visual inspection thereof.

3 Claims, 2 Drawing Figures

INVENTOR.
NICHOLAS T. COUSINS

ATTORNEYS

BORESCOPE FIXTURE

BACKGROUND OF THE INVENTION

This invention relates to means for examining inaccessible areas and more particularly to a fixture for permitting borescope examination of inaccessible engine components.

Borescopes are precision-built tubular optical instruments generally having a light source and an objective lens or prism at one end, and an ocular assembly at the other end, whereby an image formed by the objective lens is transmitted through the borescope to an ocular assembly. Borescopes are generally of a straight tube type or a flexible tube type. The straight tube type borescope may conveniently be used for viewing bores and the like of a straight or non-curving nature. The flexible type borescope may be used for viewing along curvilinear paths and the like when there is a convenient means to guide the flexible borescope. However, when there is a large cavity or the like, the flexible borescope cannot be used because there is no way to conveniently support and guide the borescope. As an example, if it is desired to visually inspect the internal part of a gas turbine engine or the like, there would be a large area inside the engine which would not support the flexible borescope and the straight tube borescope would likewise not be useful for viewing such areas.

Accordingly, an object of this invention is to provide a fixture which will permit use of a flexible borescope to make internal borescope inspection of engines.

A further object of this invention is to provide a fixture for use with a flexible borescope which will permit the borescope to be guided to the area to be inspected.

A still further object of this invention is to provide a fixture for a flexible borescope which will support the borescope.

Yet another object of this invention is to provide a fixture for use with a flexible borescope which will permit internal inspection of engines without requiring special inspection openings in the engine casing.

SUMMARY OF THE INVENTION

This invention provides a fixture for use with a flexible borescope to permit visual inspection of the inner recesses of engines without requiring special inspection openings in the engine casing. The borescope fixture is of simple and economical construction, is easy to operate and makes possible the guiding of the lens portion of the borescope through an existing hole in the casing of an engine to a predetermined position in the engine for inspection of that location.

Other objects, details, uses and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF ILLUSTRATED EMBODIMENT

Figure 1:
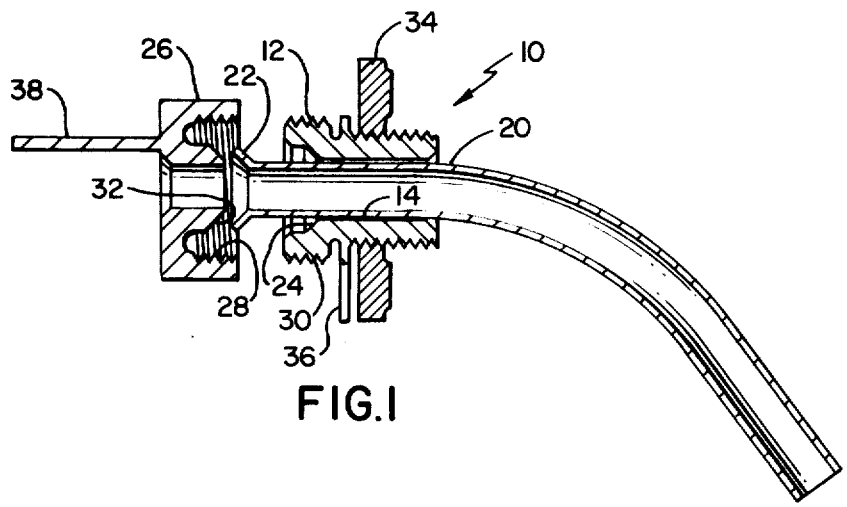
FIG. 1 is a sectional view of the borescope fixture of this invention in partially assembled form.

Reference is now made to the drawings which illustrate an exemplary embodiment of the borescope of this invention which is designated generally by the reference numeral 10. The fixture 10 comprises an externally threaded cylindrical member 12 having a bore 14 extending therethrough. The member 12 is of a dimension which can be threadably inserted in an existing threaded hole 16 in the engine casing 18, such as an igniter port or the like.

A semi-rigid plastic tube 20 is inserted through the bore 14. One end 22 of the tube 20 is complementally flared to cooperatively engage chamfered end 24 of the bore 14. A knurled thumb nut 26 is internally threaded at 28 to cooperatively engage the external threads 30 of the member 12. Thumb nut 26 is provided with a chamfered surface 32 which engages the flared end 22 of tube 20 and holds the tube in position relative to the member 12. A locking nut 34 is threadably fitted about the member 12 and is used to securely fix the position of the member 12 relative to the casing 18. The member 12 is provided with a handle or the like 36 which may be used to rotate the fixture 10 relative to the engine casing 18 to permit inspection of different locations. Thus, as the member 12 is rotated, the tube 20 will likewise be rotated so as to direct the borescope, designated generally as 40 (FIG. 2), to a different location.

Figure 2:
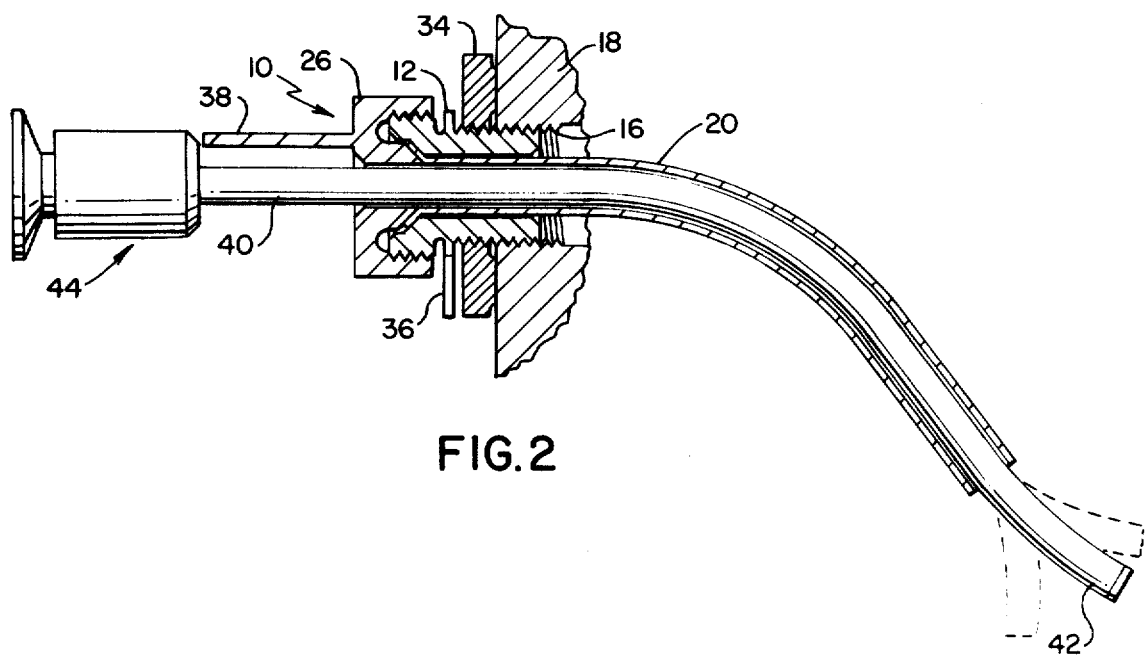
FIG. 2 is a sectional view showing the fixture of FIG. 1 in assembled form in cooperation with a borescope.

Referring particularly to FIG. 2, the fixture 10 is shown in assembled form and threadably inserted in a suitable hole 16, such as an igniter hole. The tube 20 is shaped to extend from the member 12 to the location within the engine casing 18 where inspection is desired. The thumb nut 26 holds the tube 20 in place relative to the member 12 and the locking nut 34 positions the member 12 relative to the casing 18. The flexible borescope 40 is inserted through the tube 20 so that the lens end 42 projects beyond the end of tube 20. An axial projection 38 engages a shoulder of the borescope 40 to limit the inward movement of the borescope. The lens end 42 of the borescope 40 may be focused and articulated from the observation end 44. It is thus seen that the tube 20 supports and guides the flexible or limp portion of the borescope 40 to a predetermined location within the engine casing 18 for visual inspection thereof. Articulation of the lens end 42, as shown by dashed lines, permits the desired inspection. If it is desired to move the lens end 42 to a new location, the locking nut 34 is loosened and the fixture 10 may be rotated by use of the handle 36 after which the nut 34 is again tightened against casing 18 to lock the fixture 10 in position. It should be further noted that it is possible to utilize differently shaped tubes in the fixture 10 to permit inspection of different areas of the engine without engine disassembly.

It can be seen that the use of this fixture permits the internal inspection of engines by a flexible borescope without the necessity of engine disassembly or providing special inspection ports. Accordingly, the objectives hereinbefore set forth have been accomplished.

While a present exemplary embodiment of this invention has been illustrated and described, it will be recognized that this invention may be otherwise variously embodied and practiced by those skilled in the art.

What is claimed is:

1. A borescope fixture for supporting and guiding a flexible borescope having a lens end to a desired location within an engine casing for visual inspection of that location comprising:
   an externally threaded cylindrical member for insertion into threaded engine port, said member having a bore therethrough, one end of the bore being chamfered;
   borescope guide means extending through the bore for receiving a flexible borescope therethrough and guiding the lens end of the borescope to the desired inspection location, said means having one end shaped to conform with said chamfered end of said cylindrical member;
   an internally threaded nut for threadably engaging one end of said cylindrical member, said nut having a chamfered portion for engaging the formed end of said guide means and urging said formed end against the chamfered portion of said cylindrical member to locate said guide means therebetween; and
   a locking nut for locking said cylindrical member relative to the engine casing.

2. The fixture as set forth in claim 1 in which said borescope guide means is a semi-rigid tube and further comprising a handle on said cylindrical member for permitting rotation of said cylindrical member relative to the engine casing.

3. The fixture as set forth in claim 2 in which said tube is plastic and in which said internally threaded nut includes an axially extending projection for engagement with a portion of the borescope to limit the movement of the borescope through the borescope fixture.

* * * * *